United States Patent [19]

Yamashita et al.

[11] Patent Number: 4,695,710
[45] Date of Patent: Sep. 22, 1987

[54] ELECTRIC RICE COOKER WITH TIMER HAVING PLURAL MEMORY AREAS

[75] Inventors: Kiyoshi Yamashita, Aichi; Terutaka Aoshima, Toyohashi; Ryuuho Narita; Masahiro Imai, both of Nagoya, all of Japan

[73] Assignee: Kabushiki Kaisha Toshiba, Kawasaki, Japan

[21] Appl. No.: 856,287

[22] Filed: Apr. 28, 1986

[30] Foreign Application Priority Data

Oct. 4, 1985 [JP] Japan ................... 60-222077

[51] Int. Cl.⁴ .............................. H05B 1/02
[52] U.S. Cl. .................... 219/506; 219/492; 340/712
[58] Field of Search ......... 219/492, 497, 506, 10.55 B, 219/508; 340/692, 384 E, 569, 584, 540, 802, 712, 713, 792

[56] References Cited

U.S. PATENT DOCUMENTS

| 4,266,118 | 5/1981 | Takase et al. | 219/506 |
| 4,343,990 | 8/1982 | Ueda | 219/492 |
| 4,390,766 | 6/1983 | Horinouchi | 219/506 |

FOREIGN PATENT DOCUMENTS 60-50481 10/1983 Japan.

Primary Examiner—M. H. Paschall
Attorney, Agent, or Firm—Cushman, Darby & Cushman

[57] ABSTRACT

An electric rice cooker includes a memory device having three storage areas for storing a plurality of cooking completion time data, a selection circuit selecting a desired cooking completion time data from the memory device, a display device displaying the selected cooking completion time data or the current time data and a lamp arrangement not only indicating the storage area from which the cooking completion time data displayed by the display device is read out but also indicating a current time display when the current time data is displayed by the display device. The selection circuit includes a memory timer switch and a pulse counter which counts the number of times the memory timer switch is pressed, and reads out a desired cooking completion time data from the designated storage area in the memory device on the basis of the result of the counting.

12 Claims, 4 Drawing Figures

ELECTRIC RICE COOKER WITH TIMER HAVING PLURAL MEMORY AREAS

BACKGROUND OF THE INVENTION

1. Field of the Invention

The present invention relates in general to electric rice cookers. More specifically, the invention relates to an electric rice cooker which has a timer and carries out cooking, i.e. so-called "timer-controlled cooking", at a desired time.

2. Description of the prior art

Electric rice cookers which employ a cooking control circuit composed of a microcomputer are now well-known. Using timer-controlled cooking, cooking is completed at a desired time by using a counting function which is provided by the microcomputer. An operator inputs data representing current time and a desired cooking completion time. The cooking completion time data is stored in a memory means. Cooking start time data is "computed" by subtracting the value of a desired cooking period of time from the value of the cooking completion time data. Cooking operation begins after a lapse of a standby period of time which is obtained by subtracting the value of the current time data from the value of the cooking start time data.

There are circumstances wherein it is desirable to carry out a rice cooker cooking operation at the same time everyday. Furthermore, the cooking operation may be carried out at a plural number of times during the day, e.g. in the morning, at noon, and in the evening. A conventional rice cooker with timer, which is able to store only one cooking completion time, cannot achieve the desired result. Even if a cooking operation is completed at a desired time which has been set for a morning meal, the operator must again set a new cooking completion time into the memory means so as to "program" the cooking operation for an evening meal. Even though the conventional device has a memory, the operator must set a cooking completion time into the memory each time he wants to carry out an automatic cooking operation.

SUMMARY OF THE INVENTION

It is an object of the invention to provide an improved electric rice cooker wherein a user can more easily set or "program" timer-controlled cooking and moreover to enable the user to set or "program" the cooker to carry out timer-controlled cooking at a plural number of times everyday.

The rice cooker arrangement according to the present invention accomplishes this object. It comprises a memory arrangement including three storage areas for storing a plurality of cooking completion time data, a selection circuit for selecting a desired cooking start time set circuit for determining a cooking start time data by subtracting the value of cooking period of time from the value of the cooking completion time data selected, a time comparison circuit for producing a coincidence signal when the current time data which is fed from a counting function and the cooking start time data coincide with one another, display device for displaying the selected cooking completion data or the current time data and a cooking execution circuit for executing a prescribed cooking program in accordance with the coincidence signal. The selection circuit includes a memory timer switch and a pulse counter which counts the number of times the memory timer switch is pressed, and reads out a desired cooking completion time data from the memory arrangement on the basis of the result of the resulting count. The display device includes a lamp arrangement which indicates not only the storage area from which the time data displayed in the display device is read out on the basis of the number of times the memory timer switch is pressed but also a current time display when the current time data, rather than cooking completion time data, is displayed by the display device.

BRIEF DESCRIPTION OF THE DRAWINGS

The present invention is best understood with reference to accompanying drawings in which.

DETAILED DESCRIPTION OF A PREFERRED EXEMPLARY EMBODIMENT

An exemplary embodiment of the present invention will be now described in more detail with reference to the accompanying drawings.

Figure 1:
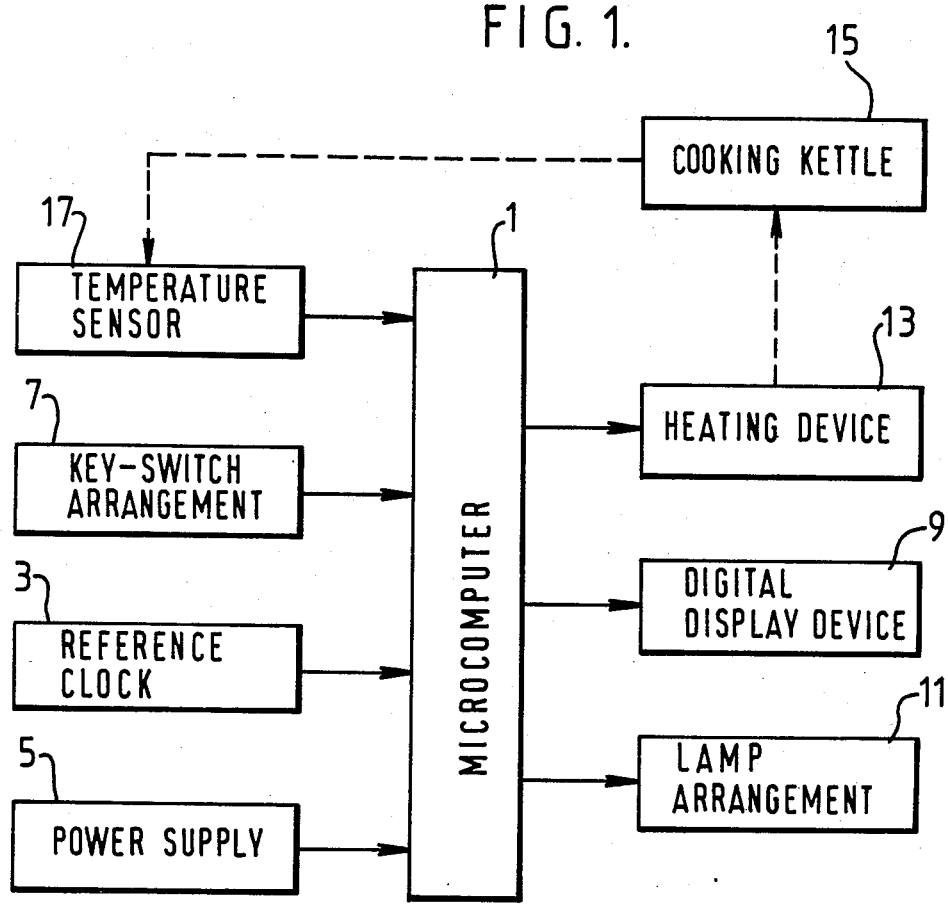
FIG. 1 is a general block diagram of an exemplary embodiment of the present invention.

FIG. 1 is a general block diagram of the exemplary embodiment of an electric rice cooker embodying the invention. A microcomputer 1 (cooking control circuit), performs a counting function based on a clock signal from a reference clock 3 that is provided with power from an electric power supply 5. Cooking data such as e.g. cooking completion time data and a current time data, are inputted into microcomputer 1 by operating a key-switch arrangement 7. The cooking data inputted is displayed by a digital display device 9 and a lamp arrangement 11. Microcomputer 1 energizes a heating device 13 which includes an electric heater at an appropriate time in accordance with the cooking data inputted via key-switch arrangement 7 (the dash lines in FIG. 1 represent a heat transfer). Thus, a cooking kettle 15, which contains a suitable amount of rice and a proper amount of water to be cooked, is heated. The temperature of cooking kettle 15 is detected by a temperature sensor 17, which sends a temperature data to microcomputer 1. Microcomputer 1 controls heating device 13 to turn on and off on the basis of the temperature data from sensor 17 and thus sequentially carries out each cooking process, i.e. SOAK, COOKING, SUPPLEMENTAL COOKING and KEEP WARM, in accordance with a prescribed cooking program. Each cooking process is displayed by digital display device 9 with the progress of cooking.

Figure 2:
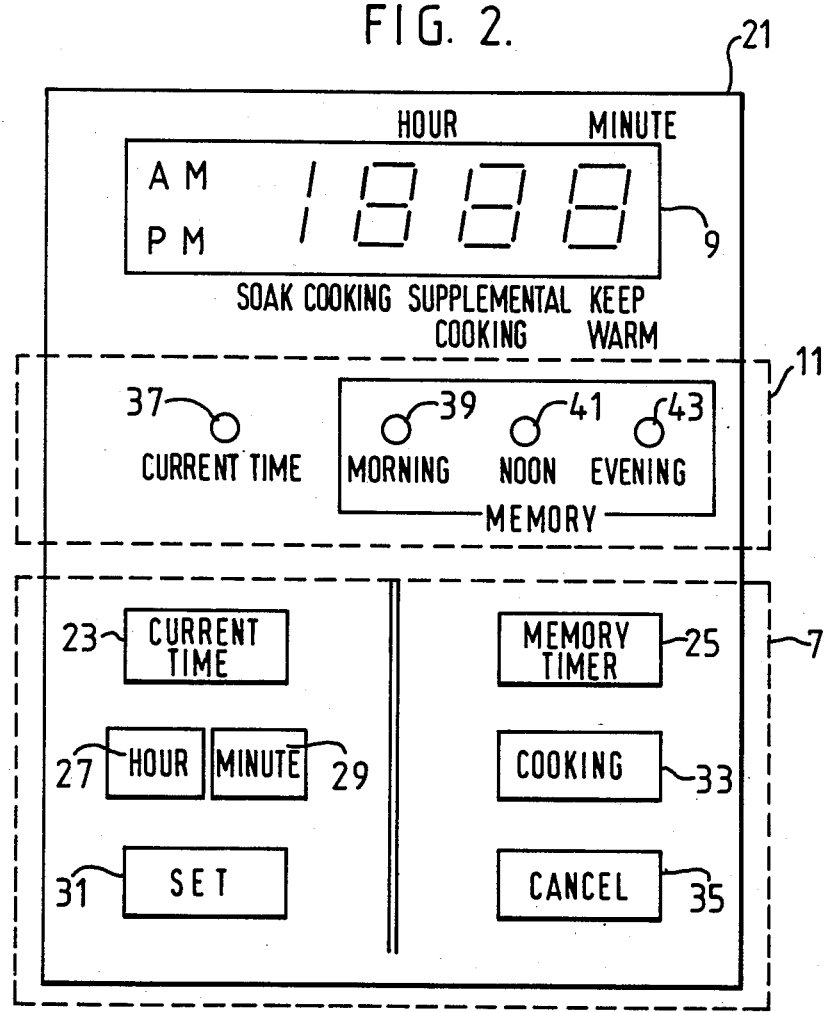
FIG. 2 is a front view of an operation panel of the invention.

FIG. 2 shows the key-switch arrangement 7, digital display device 9 and lamp arrangement 11. These components are arranged in an operation panel 21. Key-switch arrangement 7 includes a "current time" switch 23 for selecting a current time mode where a current time data may be inputted to the microcomputer 1, a "memory timer" switch 25 for selecting a memory area selective mode where the desired memory area may be selected and a desired cooking completion time data may be inputted into and read out from respective memory areas, and a "hour" switch 27 and a "minute"

switch 29 for inputting time of day data. Key-switch arrangement 7 further includes a "set switch" 31 which sets the time of day data inputted by "hour" switch 27 and "minute" switch 29 into a microcomputer 1, a "cooking" switch 33 for selecting either timer-controlled cooking or starting cooking (when no timer-controlled cooking is set) and a "cancel" switch 35.

Digital display device 9, composed of four-figure seven-segment type light-emitting diodes, not only displays the time of day data inputted by "hour" switch 27 and "minute" switch 29 mentioned above but also sequentially displays each cooking process (SOAK, COOKING, SUPPLEMENTAL COOKING and KEEP WARM) as mentioned above. Lamp arrangement 11 includes a lamp 37 (hereafter referred to as current-time-lamp) indicating a current time display and lamps 39, 41 and 43. Lamps 39, 41 and 43 correspond to individual memory areas of a memory means explained hereafter and indicate the memory area from which the time data displayed in digital display device is read out.

Figure 3:
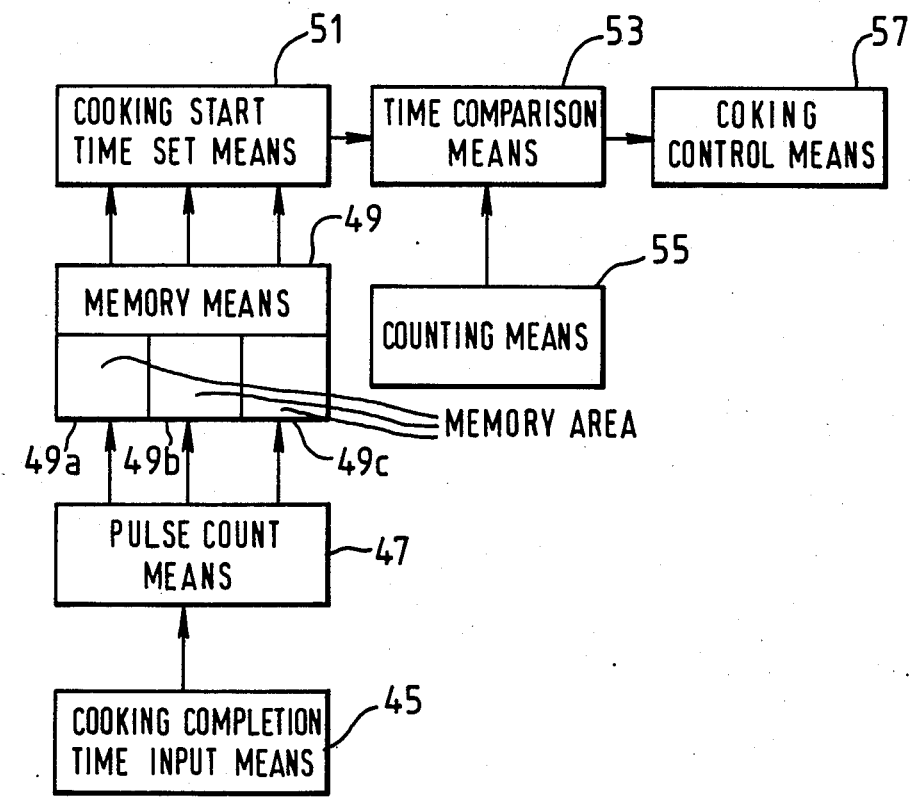
FIG. 3 is a more detailed block diagram of microcomputer 1 shown as a block in FIG. 1.

The construction of microcomputer 1 will be described hereinafter with reference to the block diagram shown in FIG. 3. Cooking completion time input means 45 outputs the key signal inputted by key-switch arrangement 7 as shown in FIG. 1 to a pulse count means 47, wherein the number of times "memory timer" switch 25 is pressed is counted as a number of pulses. Individual memory areas 49a, 49b and 49c of a memory means 49 are selectively designated on the basis of the result of this count. Therefore, individual cooking completion time (e.g. for morning meal, lunch and evening meal) inputted by key-switch arrangement 7 is stored into individual corresponding memory areas 49a, 49b and 49c.

Cooking start time set means 51, which receives the cooking completion time data selected from memory means 49, calculates an actual cooking start time data by subtracting the value of a prescribed cooking period of time data, e.g. one hour, from the cooking completion time data selected, and then sends this to a time comparison means 53. Time comparison means 53 compares the actual cooking start time data with the current time data fed from a counting means 55 and sends a coincidence signal to a cooking control means 57 when these time data coincide with one another. In accordance with this coincidence signal, cooking control means 57 executes a prescribed cooking program, and thus cooking is started.

Figure 4:
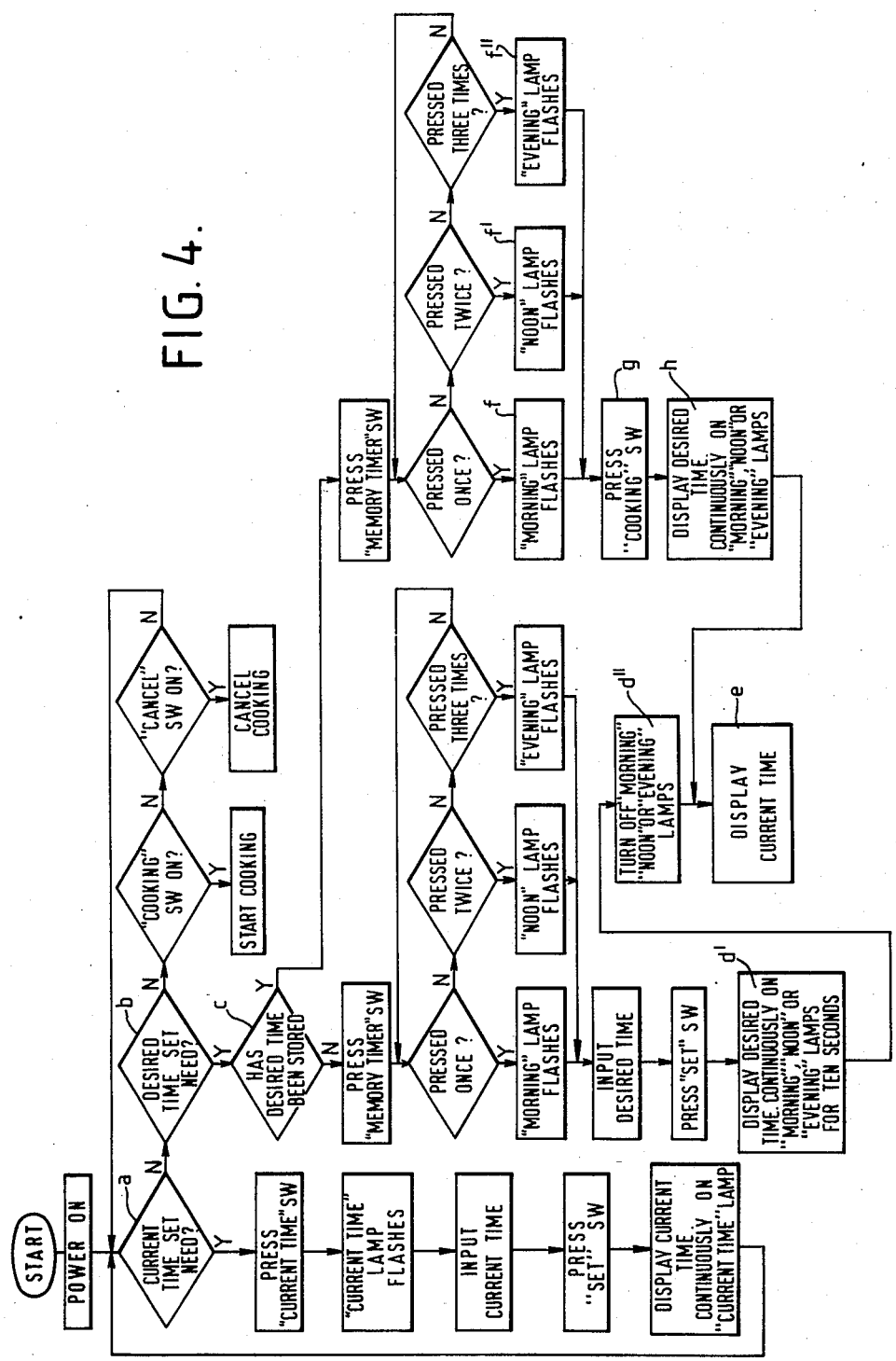
FIG. 4 is a flow chart showing set operations of a memory area selective mode and a current time mode of one embodiment.

The operation of the above-described construction will be described referring to the explanatory flow chart diagram shown in FIG. 4. In the case of an initial setting of current time data and cooking completion time data, a current time has not yet been set, thus the YES path is taken at decision step a. When "current time" switch 23 is operated (current time mode), current-time lamp 37 flashes and the current time data can be input into microcomputer 1. When operating in this state, a time of day is displayed by digital display device 9 by operating "hour" switch 27 and "minute" switch 29. When "set" switch 31 is pressed at the time when the current time is displayed by digital display device 9, current-time-lamp 37 ceases flashing and becomes continuously lit and the current time data is set in microcomputer 1. After this operation, in order to set cooking completion time data, since no cooking completion time data are set and stored, decision steps b and c result in YES and NO paths, respectively. At this stage, when memory timer switch 25 is pressed (memory area selective mode), each cooking completion time data can be inputted into individual memory areas 49a, 49b and 49c of memory means 49 corresponding to the number of time memory timer switch 25 is pressed. When "memory timer" switch 25 is pressed once, lamp 39 (hereafter referred to as morning-lamp) for indicating the cooking completion time display for a morning meal is flashing and a cooking completion time display for a morning meal is flashing and a cooking completion time data for morning meal can be input. Under this state, the cooking completion time data is displayed by digital display device 9 by operating "hour" switch 27 and "minute" switch 29. When "set" switch 31 is operated at the time when the desired cooking completion time data is being displayed in digital display device 9, morning-lamp 39 changes from flashing to continuously (lit) on and the desired cooking completion time is displayed for ten seconds (step d'). At the same time, the desired cooking completion time data is stored into memory area 49a of memory means 49. After this, morning-lamp 39 is turned off (step d"), whereupon the current time data is displayed (instead of the cooking completion time data) by digital display device 9 and current-time-lamp 37 is on (lit) (step e).

When "memory timer" switch 25 is pressed two or three times, lamp 41 (hereafter referred to as noon-lamp) or 43 (hereafter referred to as evening-lamp) for indicating cooking completion time display for lunch or evening meal are flashing and a desired cooking completion time display for lunch or evening meal are flashing and a desired cooking completion time data for lunch or evening meal can be inputted.

Under this state, the desired cooking completion time data for lunch or evening meal are stored into corresponding memory areas 49b or 49c of memory means 49 by the same operation as described above. It should be noted that the counting function for counting the time of day and cooking completion time data stored by the operation mentioned above are maintained with a suitable means such as a secondary cell, even if an electric power is turned off.

The operation for selecting a desired cooking completion dime data from memory areas 49a, 49b and 49c., i.e. timer set operation, will be described hereinafter. As the current time data is set and cooking completion time data are already stored, in step f, morning-lamp 39 is flashing and the cooking completion time data in memory area 49a is displayed on and off in digital display device 9 when "memory timer" switch 25 is pressed once. Under this state, when "cooking" switch 33 is pressed within ten seconds (in step g), the time data (cooking completion time data for morning meal) displayed in digital display device 9 is set in microcomputer 1 thus completing the timer setting, while the display of digital display device 9 and morning-lamp 39 are both changed from flashing to continuously on (in step h). The display of digital display device 9 is changed from the cooking completion time data to the current time data after a lapse of ten seconds from the time when morning-lamp 39 began flashing (in step e). Morning-lamp 39, at this time, stays lit and thus indicates that the cooking completion time data for morning meal is already set.

Following the operation described above, cooking start time set means 51 determines an actual cooking start time on the basis of the cooking completion time data stored. Time comparison means 53 makes a comparison between the actual cooking start time data and the current time data fed from counting means 55 and sends a coincidence signal to cooking control means 57 when both of the time data coincide with one another. As the result, cooking control means 53 executes in sequence each cooking process i.e. SOAK, COOKING, SUPPLEMENTAL COOKING and KEEP WARM in accordance with a prescribed cooking program.

If "cooking" switch 33 is not operated within ten seconds from the time morning-lamp 39 starts flashing, digital display device 9 changes from a flashing display of the selected cooking completion time data to a continuous display of the current time data. As a result microcomputer 1 returns to the state where desired cooking completion time data may be selected.

When a timer set operation for lunch is performed after the completion of cooking for morning meal, the cooking completion time data stored in memory area 49b of memory means 49 is read out by pressing "memory timer" switch 25 twice, at the same time, the cooking completion time data read out from memory area 49b is displayed by digital display device 9 and noon-lamp 41 is flashing in step f'. The operations to then be carried out are similar to the above-described operations. Therefore they are not described.

Similarly, the cooking completion time data stored in memory area 49c of memory means 49 is read out by pressing "memory timer" switch 25 three times to carry out a timer set operation for evening meal. Cooking completion time data read out from memory area 49c is displayed by digital display device 9 and evening-lamp 43 is flashing in step f''. The cooking completion time data stored in memory area 49a of memory means 49 can be also read out by pressing "memory timer" switch 25 once to carry out timer set operation for the next morning meal in step f.

According to the above-described embodiment, since the operator can input a desired cooking completion time data to a cooking control circuit (microcomputer) without calculating any standby period of time, the timer set operation can be easily performed. Moreover, since three different cooking completion time data may be set into individual memory areas 49a, 49b and 49c of memory means 49, input of desired cooking completion time data in every timer setting can be avoided.

In summary, it will be seen that the present invention overcomes the disadvantages of the prior art and provides an improved electric rice cooker which can be carried out each timer set operation for a plural number of times of timer-controlled cooking everyday without any need to input individual cooking completion time data for each occasion.

The invention has been described with respect to a specific embodiment. However, other embodiments based on the principles of the present invention should occur to those of ordinary skill in the art. Such embodiments are intended to be covered by the claims.

What is claimed is:

1. An electric rice cooker with a timer, comprising:
   memory means for storing a plurality of cooking completion time data;
   selection means for selecting a desired cooking completion time data from said memory means;
   setting means for altering according to a user command, a selected cooking completion time and storing the altered cooking completion time in said memory means;
   cooking start time means for calculating a cooking start time data by subtracting the value of a prescribed period of time from the value of the cooking completion time data;
   timing means for producing current time data;
   comparison means for comparing the cooking start time data with the current time data fed from said timing means, said comparison means outputting a coincidence signal when both the cooking start time data and the current time data coincide with one another;
   display means for displaying one of the selected cooking completion time data and the current time data; and
   cooking control means for executing a prescribed cooking program when receiving the coincidence signal from said comparison means.

2. The electric rice cooker according to claim 1, wherein said memory means includes three storage areas.

3. The electric rice cooker according to claim 2, wherein, said three storage areas are respectively assigned for inputting individual cooking completion time data for morning meal, lunch and evening meal.

4. The electric rice cooker according to claims 2, wherein said selection means includes a memory timer switch and pulse count means for counting a number of times the memory timer switch is pressed whereby the selection means reads out desired cooking completion time data from the storage area corresponding to the number of times the memory timer switch is pressed.

5. The electric rice cooker according to claim 4, wherein said display means includes indication means for indicating, when energized, that current time rather than cooking completion time data is being displayed by the display means.

6. The electric rice cooker according to claim 4, wherein said display means further includes three storage-area-indication elements, which correspond to respective storage areas, each of which is selectively energized on the basis of the number of times the memory timer switch is pressed so as to indicate the storage area from which the time data displayed in the display means is read out.

7. The electric rice cooker according to claim 6, wherein each said storage-area-indication element is a lamp.

8. The electric rice cooker according to claim 1, wherein said prescribed period of time is a cooking period of time.

9. The electric rice cooker according to claim 3, wherein said selection means includes a memory timer switch and pulse count means for counting a number of times the memory timer switch is pressed whereby the selection means reads out desired cooking completion time data from the storage area corresponding to the number of times the memory timer switch is pressed.

10. The electric rice cooker according to claim 9, wherein said display means includes indication means for indicating, when energized, that current time rather than cooking completion time data is being displayed by the display means.

11. The electric rice cooker according to claim 9, wherein said display means further includes three storage-area-indication elements, which correspond to respective storage areas, each of which is selectively energized on the basis of the number of times the memory timer switch is pressed so as to indicate the storage area from which the time data displayed in the display means is read out.

12. The electric rice cooker according to claim 11, wherein each said storage-area-indication element is a lamp.

* * * * *